United States Patent Office 2,728,756
Patented Dec. 27, 1955

2,728,756

DI-TERT-BUTYL PEROXYDICARBONATE FOR ETHYLENE POLYMERIZATION

Herbert N. Friedlander, Homewood, Ill., assignor to Standard Oil Company, Chicago, Ill., a corporation of Indiana No Drawing. Application September 30, 1952,
Serial No. 312,405

3 Claims. (Cl. 260—94.9)

This invention relates to peroxy esters. More particularly, it relates to a novel peroxydicarbonate ester and to the utilization thereof as an improved catalyst for the polymerization of ethylene to solids of high molecular weight.

The peroxydicarbonic acid esters of primary and secondary alcohols are known to the art, and have heretofore been employed as catalysts for the polymerization of ethylene. For this purpose, however, they have certain shortcomings which arise out of the fact that they are quite unstable—so unstable, in fact, that the ester decomposition fragments act upon and decompose additional ester in a chain reaction, thereby competing with the polymerization reaction. Thus, a large part of the ester is ineffective for starting polymer chains, the rate of polymerization continuously diminishes, and the conversion of ethylene to polymer is substantially lower than would be expected from a given weight of catalyst.

I have now prepared di-tert-butyl peroxydicarbonate, an ester which has hitherto been unknown. This ester, unlike the prior-art esters, cannot easily undergo decomposition by a chain reaction, owing to the fact that its alkyl groups contain no secondary or tertiary hydrogen atoms which are subject to attack. The di-tert-butyl ester therefore gives faster polymerization rates, better catalyst utilization, and better yields of polymers than any of the other peroxydicarbonate esters. Furthermore, because of its non-susceptibility to chain decomposition, di-tert-butyl peroxydicarbonate is far more stable and safer to handle than the other peroxydicarbonate esters.

Di-tert-butyl peroxydicarbonate can conveniently be prepared by treating tert-butyl chloroformate in aqueous solution at 0 to 10° C. with a mixture of aqueous sodium hydroxide and a peroxide such as sodium peroxide, barium dioxide, hydrogen peroxide, or the like, with or without an organic solvent such as pentane or ethyl ether. The tert-butyl chloroformate can be made, for example, by the action of phosgene at 0–155 C. on either tert-butyl alcohol or sodium tert-butoxide.

The following example will illustrate the preparation of di-tert-butyl peroxydicarbonate. Tert-butyl chlorocarbonate was prepared by the method of Choppin and Rogers (J. Am. Chem. Soc., 70, 2967 (1948)) from phosgene and sodium tert-butoxide. A 60%-pure product was obtained in 31 percent yield, based on sodium tert-butoxide. The crude product was used directly in the subsequent operation, since it decomposes rapidly at temperatures above 10° C. Into a three-neck flask cooled with ice were introduced with stirring 70 grams of the impure tert-butyl chlorocarbonate, 50 milliliters of distilled water, 60 milliliters of n-pentane, and 20 milliliters of 30 percent hydrogen peroxide. A solution of 14 grams of sodium hydroxide in 50 milliliters of water was then added dropwise, the temperature being maintained below 6 to 8° C. at all times. The reaction was completed within a very short time. The pentane layer was then decanted, washed twice with water, and dried over sodium sulfate. The dry pentane layer was withdrawn and chilled in Dry Ice, whereupon di-tert-butyl peroxydicarbonate separated as a crystalline solid. The pentane mother liquor was decanted and the occluded pentane was removed from the crystals by evacuation at 0° C. The resulting product was a dry, white solid weighing 10.5 grams and melting at 28 to 30° C. On titration for active oxygen, the product was shown to be 92.6 percent pure di-tert-butyl peroxydicarbonate, obtained in 25 percent yield based on the tert-butyl chlorocarbonate originally used.

Di-tert-butyl peroxydicarbonate is more stable to impact at room temperature than other peroxydicarbonate esters or benzoyl peroxide. A 563-gram hollow steel sphere, when dropped on a sample of di-tert-butyl peroxydicarbonate at room temperature from a height of 200 centimeters, did not detonate it. Benzoyl peroxide, in contrast, detonated at 70 centimeters. Diethyl peroxydicarbonate detonated at 15 centimeters at 0° C. Diisopropyl peroxydicarbonate detonated at 20 centimeters at 0° C. and 200 centimeters at −40° C. When di-tert-butyl peroxydicarbonate is dissolved to a concentration of 0.4 to 0.6 weight-percent in toluene, it decomposes with a half life of about 22 hours at 45° C. and about 4.5 hours at 55° C. This is in approximately the same range as the decomposition rate observed for other peroxydicarbonate esters, except that the half life of the di-tert-butyl ester is affected to a lesser extent by its concentration in the solution.

The new ester of my invention can advantageously be employed for the polymerization of ethylene to solids of high molecular weight. The polymerization process can be carried out satisfactorily at a temperature between about 0 and 100° C., preferably 25 to 75° C., pressures between about 1,000 and 10,000 pounds per square inch, preferably 5,000 to 8,000 pounds per square inch, and ditert-butyl peroxydicarbonate concentrations in the range of about 0.01 to 2 percent by weight of the ethylene charged. The process can be carried out batchwise or in a continuous fashion, and preferably in the presence of an aqueous or organic solvent. The products have a specific viscosity ordinarily within the range of about 5,000 to 25,000.

To illustrate the utility of my new catalyst, a series of tests were carried out on the polymerization of ethylene. In each test, a stainless-steel reaction bomb was carefully cleaned and flushed with ethylene, then charged with the desired quantity of ethylene (containing 9 p. p. m. $O_2$) and the desired quantity of di-tert-butyl peroxydicarbonate. The reaction bomb was sealed, heated to the desired reaction temperature for the desired time, cooled, and unloaded. The product was collected and analyzed in a conventional manner. The results were as follows:

| Run No. | Ethylene, g. | Catalyst, wt. percent | Time, hr. | Temp., °C. | Pressure, lb./in.$^2$ | | | Polymer Product, g. | Conv., wt. percent | Specific Viscosity [1] (×10$^{-5}$) |
|---|---|---|---|---|---|---|---|---|---|---|
| | | | | | Peak | Final | Avg. | | | |
| A | 147 | 0.065 | 4 | 50–55 | 5,400 | 3,350 | 4,400 | 6.5 | 4.4 | 18,900 |
| B | 151 | 0.13 | 4 | 55–60 | 6,320 | 4,100 | 5,200 | 28.6 | 19.0 | 31,800 |
| C | 151 | 0.26 | 4 | 54–96 | 7,930 | 4,250 | 5,400 | 23.1 | 15.3 | 11,000 |
| D | 147 | 0.065 | 2 | 65–70 | 6,460 | 5,500 | 5,975 | 10.2 | 7.0 | 16,000 |
| E | 147 | 0.13 | 2 | 70 | 6,720 | 5,220 | 5,975 | 15.2 | 10.4 | 11,500 |
| F | 152 | 0.13 | 0.5 | 50–57 | 6,030 | 5,900 | 5,900 | 1.3 | 0.9 | 7,500 |
| G | 151 | 0.13 | 1 | 50–57 | 5,830 | 5,550 | 5,740 | 3.7 | 2.5 | 10,300 |

[1] Specific viscosity is the ratio of the viscosity of a 0.125 gram solution of the polymer in 100 ml. of xylene to the viscosity of pure xylene at 110° C. minus one.

In accordance with the foregoing description, I claim as my invention:

1. Di-tert-butyl peroxydicarbonate.
2. A process for polymerizing ethylene which comprises subjecting ethylene to contact with between about 0.01 and 2 percent by weight of di-tert-butyl peroxydicarbonate at a temperature between about 0 and 100° C. and a pressure between about 1,000 and 10,000 pounds per square inch, whereby said ethylene is converted into normally solid products of high molecular weight.
3. A process for polymerizing ethylene which comprises subjecting ethylene to contact with between about 0.01 and 2 percent by weight of di-tert-butyl peroxydicarbonate at a temperature between about 25 and 75° C. and a pressure between about 5,000 to 8,000 pounds per square inch, whereby said ethylene is converted into normally solid products of high molecular weight.

References Cited in the file of this patent

UNITED STATES PATENTS

| | | |
|---|---|---|
| 2,370,588 | Strain | Feb. 27, 1945 |
| 2,475,648 | Stoner | July 12, 1949 |

OTHER REFERENCES

Perry: "Properties and Uses of Some Novel Organic Peroxides," page 1, Union Bay State Chemical Co.